United States Patent [19]
Prosky

[11] 4,161,880
[45] Jul. 24, 1979

[54] LINEARIZED DIGITAL THERMOMETER
[75] Inventor: Howard S. Prosky, Denver, Colo.
[73] Assignee: Electromedics, Inc., Denver, Colo.
[21] Appl. No.: 867,127
[22] Filed: Jan. 5, 1978
[51] Int. Cl.² ............................................ G01N 7/20
[52] U.S. Cl. ............................ 73/342; 73/362 AR; 364/557
[58] Field of Search .................... 73/362 AR, 342; 364/557, 571, 577

[56] References Cited
U.S. PATENT DOCUMENTS

| 2,987,704 | 6/1961 | Gimple | 364/557 |
| 3,699,318 | 10/1972 | Underkoffler | 364/557 |
| 4,022,063 | 5/1977 | West | 364/557 |

Primary Examiner—S. Clement Swisher
Attorney, Agent, or Firm—Crandell & Polumbus

[57] ABSTRACT

A digital thermometer uses a microprocessor computer containing stored information relating to the response characteristics of a transducer to supply a measurement of temperature. The transducer is preferably a thermistor whose resistance varies in a predetermined and nonlinear relation to its temperature. The microprocessor computer includes a read-only memory which has been preprogrammed with piece-wise linearized information approximating the nonlinear relation of resistance and temperature of the thermistor. A current source develops a voltage across the thermistor which is related to the temperature of the thermistor. The voltage across the thermistor is converted into a digital signal, and the digital signal is related to the piece-wise linearized information stored. The temperature equivalent is calculated from a first order algebraic equation determined by the relationship of the digital signal to the stored information.

10 Claims, 12 Drawing Figures

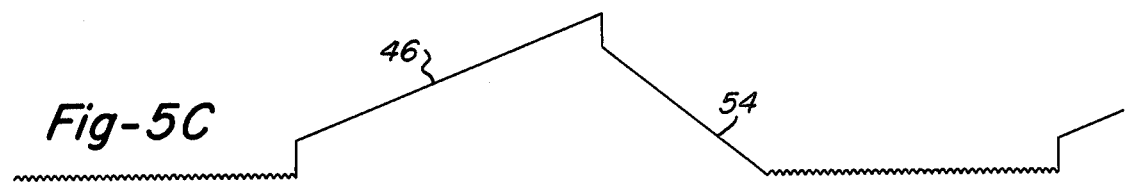
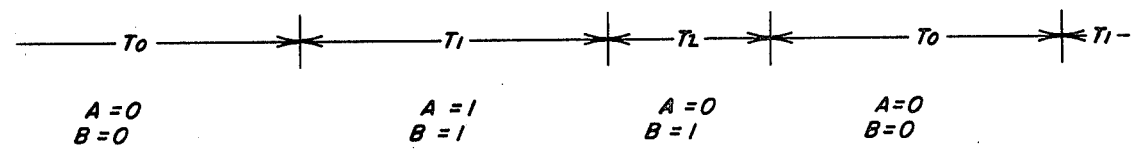
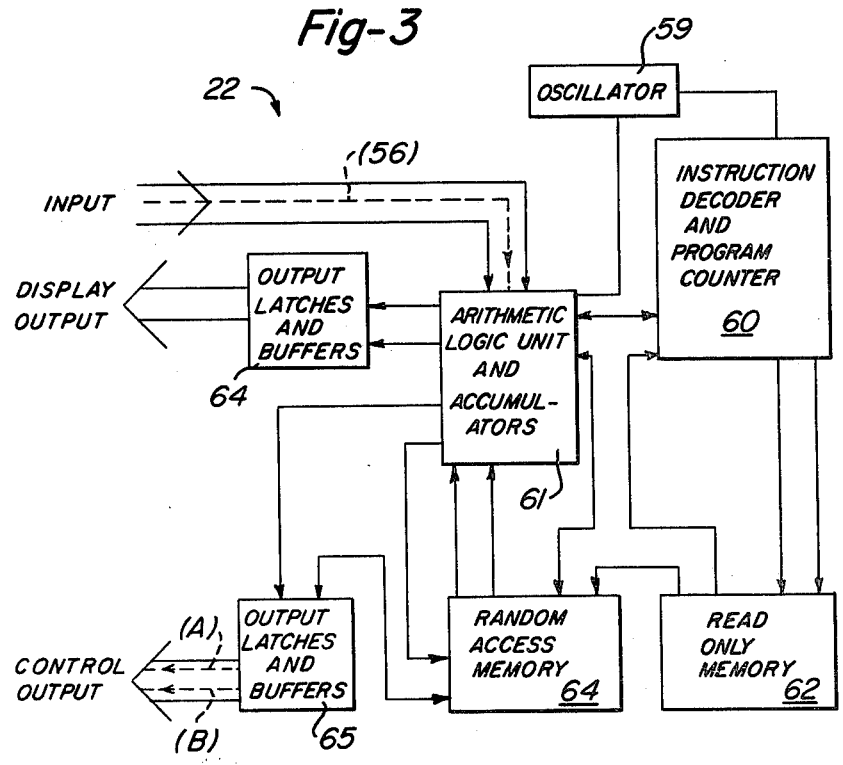

LINEARIZED DIGITAL THERMOMETER

FIELD OF THE INVENTION

This invention relates to temperature measurement and more particularly to an electronic thermometer utilizing a microprocessor computer means for calculating a temperature which is accurately equivalent to that temperature sensed by a transducer. The electronic thermometer may be utilized for a variety of uses, including a clinical thermometer for measuring the temperature of human individuals.

BACKGROUND OF THE INVENTION AND BRIEF DESCRIPTION OF PRIOR ART

Electronic thermometers employing thermistors as transducers are known in the prior art. One major limitation of these thermometers, however, is that they are limited to a relatively confined range of accurate temperature measurement. This limited range of accurate temperature measurement is not always suitable for all clinical and medical uses since there are situations where temperatures outside of the limited accurate range must be measured or checked. For example, one such situation is measuring the temperature of premature babies who typically have temperatures much lower than the normal temperature range of a human being.

The limitation to a relatively confined range of accurate temperature measurement results in significant part because the resistance characteristic of the thermistor is not linear over the temperature range of the thermistor. Consequently, in the prior art it has been necessary to chose a small portion of the resistance-temperature relationship curve of the thermistor and linearize that portion for use in calculating the temperature. Linearizating a portion of the resistance-temperature relation curve has had the effect of limiting the usable range of accuracy to about 12 degrees Fahrenheit. To avoid inaccurate temperature measurements, some prior art clinical thermometers are operative to suppress all temperatures outside of this predetermined range of accuracy. Other prior art electronic thermometers will provide information of the temperature outside of the given range of accuracy, but the user must specifically understand and appreciate that the temperature measurement is not accurate except within the predetermined range of accuracy. Thus in the prior art, either no temperature measurement is provided outside of a limited range, or the temperature measurement provided is possibly not accurate and requires the user's recognition of the potential for nonaccuracy. Neither situation is satisfactory, particularly in medical uses where accuracy and freedom from mistake can be of critical importance.

The limitations of prior art electronic thermometers are also apparent in applications other than those of a medical or clinical nature. Many industrial, laboratory, scientific, manufacturing and home situations require accurate measurements within wide temperature ranges of up to 200 degrees, for example. It is apparent that prior art electronic thermometers are not typically capable of providing accurate measurements over wide ranges.

One cause for the inability of prior art electronic thermometers to provide accurate measurements over wide temperature ranges has been the inability to accurately simulate or approximate the nonlinear response characteristics of the thermistor in a manner which can be conveniently employed to calculate temperature.

Other limitations and disadvantages of prior art electronic thermometers are known and appreciated, and limited solutions to some of these problems may have been achieved. In general, however, the various factors, problems, limitations and disadvantages present in the prior art should become more fully recognized and appreciated in light of the improvements and teachings of the present invention.

SUMMARY OF THE INVENTION

The general objective of the invention is to provide a new and improved electronic thermometer. Other objects are to obtain an expanded range of the accurate temperature measurement and to obtain highly accurate temperature measurements within the expanded range. Another object of the invention is to provide a new and improved electronic clinical thermometer of the digital electronic type utilizing elements therein which can be easily incorporated in a small clinical thermometer for taking the temperature of a human being.

In accordance with its objectives and general aspects, the invention employs means such as a transducer or thermistor, for responding in a predetermined manner to the temperature to be measured, and means such as a computer employing a microprocessor, for calculating temperature based on the response of the responding means. The microprocessor based computer means includes a memory for storing information relating to the predetermined manner of response of the responding means. More preferably, the information stored in the memory is a piece-wise linearization of the typical nonliner response of an electrical characteristic of the responding means with respect to temperatures sensed by the responding means. An analog to digital convertor converts the response of the responding means into a digital signal, under the operative control of the microprocessor based computer. The digital signal from the convertor is supplied to the computer where the digital signal is referenced to the data previously stored in memory. Thereafter, a temperature is determined or calculated mathematically from the data contained within the memory.

A more complete understanding of the invention itself and its manner of achieving the objectives can be obtained from the following description of a presently preferred embodiment of the invention taken in conjunction with a drawing consisting of a number of figures, and from the appended claims.

BRIEF DESCRIPTION OF THE DRAWINGS

FIG. 3 is a block diagram illustrating in greater detail a microprocessor based computer comprising another of the elements shown in FIG. 1.

FIGS. 5a, 5b, 5c and 5d are waveform diagrams, referenced to common time axis, illustrating operation of the converter and computer shown in FIGS. 2 and 3.

FIG. 6 also illustrates a piece-wise linearization of the graph of the temperature and resistance relationship, the piece-wise linearization being representative of information stored in the computer shown in FIG. 1.

DESCRIPTION OF THE PREFERRED EMBODIMENT

Figure 1:
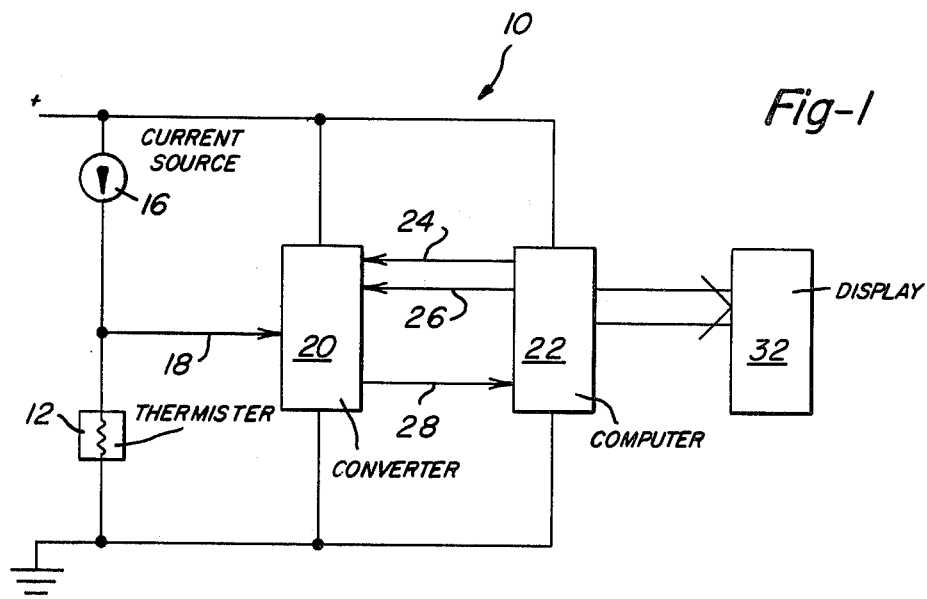
FIG. 1 is a generalized block diagram illustrating the apparatus, system and method of the linearized digital thermometer of the present invention.
Figure 6:
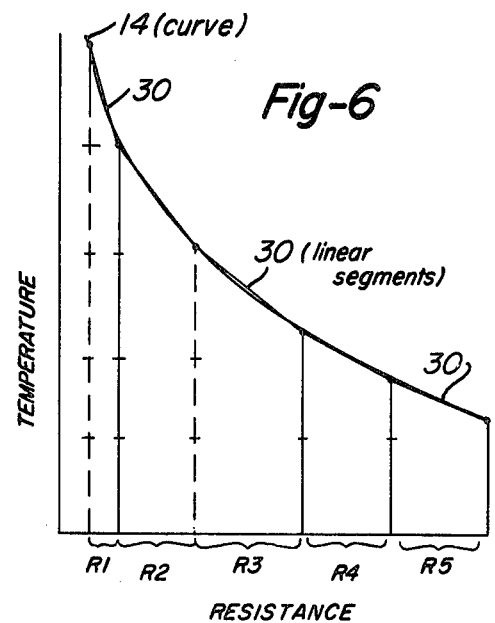
FIG. 6 is an illustrative graph of a relationship of temperature and resistance of a thermistor comprising another of the elements shown in FIG. 1.

An apparatus 10 for measuring temperature, and the system associated therewith, is illustrated in FIG. 1. The apparatus 10 employs a transducer, such as a thermistor 12, which inherently possesses an electrical characteristic, such as resistance or impedance, which varies or responds in a predetermined relationship to the temperature to which the transducer is subjected. In the case of the thermistor 12, it possesses a resistance characteristic which varies in a predetermined nonlinear relation with temperature, and this nonlinear relation is generally defined by the shape of a negative logarithmic curve illustrated by a graph 14 shown in FIG. 6. The apparatus 10 shown in FIG. 1 also includes a current source 16 for supplying current through the thermistor 12, which thereby creates a voltage across the thermistor directly related to its temperature, resulting in a voltage present on conductor 18. Conductor 18 applies the voltage across the thermistor 12 as input to an analog to digital converter 20. A microprocessor controlled computer 22 operatively controls the converter 20 by signals supplied on conductors 24 and 26. Upon the application of the appropriate control signals to conductors 24 and 26, the converter 20 becomes operative to convert the analog voltage input on conductor 18 to a digital output signal supplied on conductor 28. The digital signal supplied on conductor 28 is received by the computer 22 and is used to determine a temperature essentially equivalent to the temperature of the thermistor 12. The digital measurement signal in the computer 22 is related to preselected information stored within the memory of the computer 22 for calculation of and transformation to the equivalent temperature measurement. The preselected stored information within the computer is preferably a piece-wise linearization of the nonlinear temperature and resistane relationship of the thermistor 12. Graph 30 shown in FIG. 6 is an illustrative piece-wise linearization of the nonlinear graph 14. The computer 22 calculates the equivalent temperature of that temperature experienced by the thermistor 12 by employing a first order algebraic calculation utilizing a slope factor and a constant factor obtained from the stored piece-wise linearization information. After the equivalent temperature has been calculated, signals representative of the calculated temperature are supplied by the computer 22 to a display 32 where the equivalent temperature is visably displayed. The display 32 may comprise a plurality of conventional seven segment displays, and the computer 22 multiplexes signals representative of the calculated temperature to the display 32 in a conventional manner.

The thermistor 12 is a conventional and well known element. Typically, the thermistor will have a nonlinear relationship of temperature and resistance, and the nonlinear relationship will conventionally be a negative logarithmic relationship, as is illustrated in FIG. 6 by curve 14.

The current source 16 is a conventional constant current supply. As is shown in FIG. 1, the constant current supplied by the current source 16 flows through the thermistor 12. The current flowing through the thermistor 12 reacts with the resistance of the thermistor and creates a voltage across the thermistor which is supplied to the input of the converter 20 by the conductor 18. Since the resistance of the thermistor 12 varies in predetermined relation with the temperature to which the thermistor is subjected (graph 14 shown in FIG. 6), the constant current flowing through the resistor provides a voltage across the thermistor which varies in predetermined relation with the temperature of the thermistor. Thus, the input voltage to the analog to digital converter 20 varies in predetermined relation with the temperature of the thermistor, and that predetermined relation is directly related to the curve defined by graph 14 shown in FIG. 6.

Figure 2:
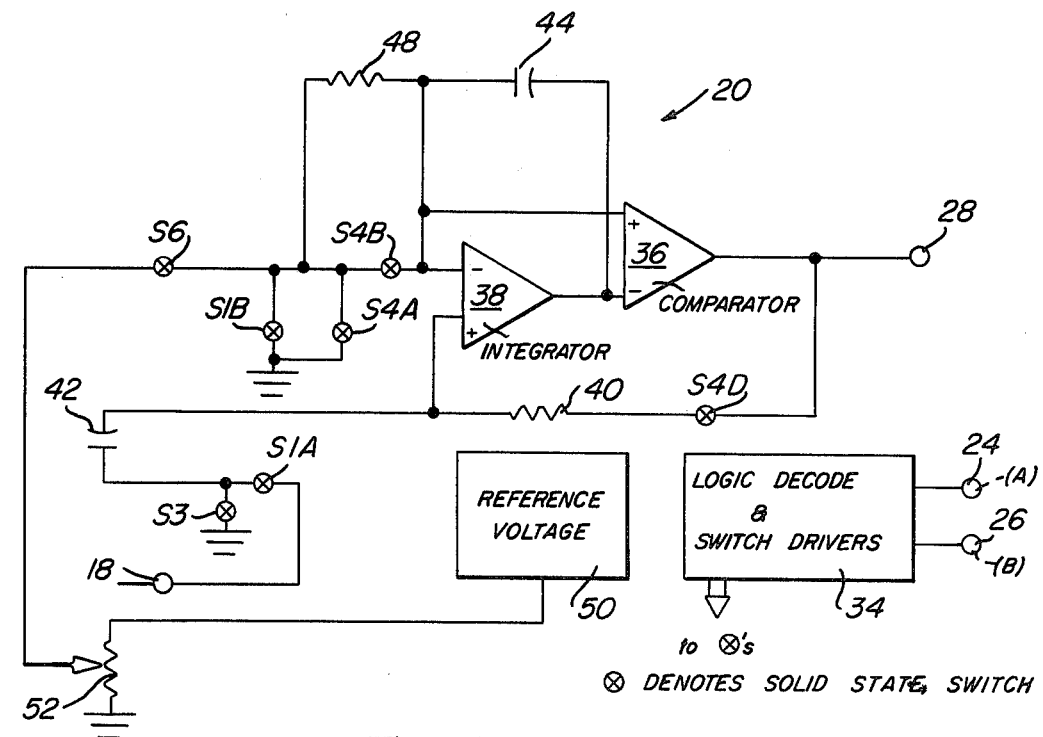
FIG. 2 is a block diagram illustrating in greater detail an analog to digital converter comprising one of the elements shown in FIG. 1.

The operation of the converter 20 in converting the input analog voltage on conductor 18 to a digital output signal on conductor 28 is best understood by reference to FIG. 2. The analog to digital converter 20 is essentially a conventional dual-slope analog to digital converter, such as Texas Instruments TL 505. The operations of the converter 20 are controlled in response to digital signals supplied on conductors 24 and 26 from the computer 22. For convenience, the signal supplied on conductor 24 will be referenced "A" herein and the signal on conductor 26 will be referenced "B". Waveform diagrams of signals "A" and "B" are respectively shown in FIGS. 5A and 5B.

Shown in FIGS. 2 and 5, signals "A" and "B" are applied on conductors 24 and 26 to a logic decode and switch drivers circuit 34. The circuit 34 decodes the signals "A" and "B" and controls a plurality of solid state switches, S1A, S1B, S3, S4A, S4B, S4D, and S6 in response to the state of signals "A" and "B". These solid state switches are therefore operatively controlled by the circuit 34.

The first step in the conversion process begins with the "A" and "B" signals being applied as zero logic signals. This condition exists during time period $T_O$. The state of the zero logic "A" and "B" signals is decoded by the circuit 34 to close switches S3 and S4A, S4B and S4D, and to open all of the remaining switches. The output of a comparitor operational amplifier 36 of the converter 20 is connected to the input of an integrator operational amplifier 38 through a low pass filter consisting of resistor 40 and capacitor 42. In this circuit condition, a closed loop exists between the comparitor 36 and the integrator 38, and the comparitor and integrator seek a condition where the offsets of the comparitor and integrator are stored on capacitors 42 and 44 respectively. This null condition is characterized by a high frequency oscillation at the output of the comparitor 36 on conductor 28 (FIG. 5D). Closure of switch S4B shortens the amount of time required to reach this null condition.

At the beginning of time period $T_1$, the signals "A" and "B" are both changed to logic 1 levels. The circuit 34 decodes the logic 1 levels of signals "A" and "B" to close switches S1A and S1B and open all the remaining switches. The analog voltage input signal on conductor 18, representative of the temperature sensed by the thermistor 12, is applied through the capacitor 42 to the noninverting input of the integrator 38. The magnitude of the input voltage on conductor 18 is positively integrated by the integrator 38, with the integrated voltage being stored on capacitor 44. The positive integration is shown by the graph portion 46 in FIG. 5C. The change in voltage of capacitor 44 (shown by graph portion 46) is directly related to the input voltage supplied on conductor 18, the value of the capacitor 44, the value of the resistor 48, the resistance of switch S1B, if any, and the length of the time period $T_1$.

At the end of time period $T_1$ and beginning of time period $T_2$, signal "A" is changed to a logic 0 level, and signal "B" is maintained at the logic 1 level. Circuit 34 decodes the "A" and "B" signals, and in response thereto closes switches S3 and S6 and opens all of the remaining switches. Closure of switch S6 applies a portion of the reference voltage of a voltage reference source 50, determined by the potentiometer 52, to the inverting input of the integrator 38. This portion of the reference voltage 50 is integrated in a negative sense by the integrator 38 until the output of the integrator 38 reaches the threshhold input voltage of the comparitor 36. The integration in the negative sense is shown by graph portion 54 in FIG. 5C. At the point where the input threshhold voltage of the comparitor 36 is reached, the output on conductor 28 from the comparitor 36 momentarily goes high, providing a high spike-like signal illustrated at 56 in FIG. 5D. At the end of time period $T_2$, the logic levels of signals "A" and "B" return to logic 0, thus beginning a new time period $T_O$.

During time period $T_2$, the change in voltage across capacitor 44 is related to the voltage conducted through potentiometer 52 from source 50, the resistance of the potentiometer 52, the value of resistor 48 and the resistance, if any, of switch S6, and the time period $T_2$. By the mathematical relationships for the positive and the negative integration described above, it can be demonstrated that the input voltage to the converter 20 on conductor 18 is directly related to the time period $T_2$, if the time period $T_1$ is maintained constant. Thus, the length of time period $T_2$ represents a digital signal which is directly related to the analog input signal applied on conductor 18.

Referring now to FIG. 3, the microprocessor computer 22 comprises a self-contained clock oscillator 59, and instruction decoder and program counter 60, and an arithmetic logic unit 61, a read-only memory 62 and a random access memory 64. Appropriate driver, multiplexing and output latching elements 64 and 65 provide conditioned output to the display 32 and converter 20, respectively. The elements of the microprocessor are typical, such as in Texas Instruments microprocessors TMC 0976 and TMC 0908 which have proved satisfactory in the present invention.

The read-only memory 62 is preprogrammed with information necessary to cause the apparatus 10 to operate in the manner described. The information stored within memory 62 also includes preprogrammed information relating to the temperature and resistance relationship of the thermistor 12, such as that shown in FIG. 6. Preferably, the information contained within the read-only memory 62 is a piece-wise linearization (graph 30) approximating the temperature and resistance relationship nonlinear curve (graph 14). Each segment or linear piece of the graph 30 is defined by a resistance range R1, R2, R3, R4 and R5, for example. Within each of these ranges, the relation of temperature and resistance of the thermistor has been approximated as a linear relationship, and within each resistance range that relationship is defined by one linear segment of the piece-wise linearized curve. By using the linear approximation over each of the resistance ranges, an equivalent temperature can be calculated by an algorithym following a first order algebraic equation.

Over each resistance range, the slope of the linear segment and a constant are preprogrammed into the read-only memory 62 in a look-up table. Utilizing the slope information and the constant information in a first order algebraic equation, the equivalent temperature is calculated.

An equivalent temperature is calculated in the following manner. As has been explained previously, the length of time period $T_2$ is directly related to the input voltage applied to the converter 20. Of course, the input voltage is directly related to the resistance of the thermistor 12. The length of the time period $T_1$ is a predetermined constant determined by the computer 22. The computer 22 controls the length of time period $T_1$ and the beginning of time period $T_2$ by changing the logic level of signal "A" from a logic 1 to logic 0, as is shown by FIG. 5A. Thereafter, a counter within the computer 22 receives count signals from the computer oscillator 59 during the time period $T_2$. The termination of the count of time period $T_2$ is accomplished by receipt of the spike-like signal 56 supplied by the converter 22 on conductor 28, at the termination of the negative integration represented by graph portion 54 in FIG. 5. By this arrangement, the computer 22 dervies a digital measurement signal representing the length of time $T_2$. The digital measurement signal defines a resistance value which falls at a point on the resistance axis of FIG. 6 and within one of the resistance ranges R1 through R5. The computer relates this digital measurement signal to the proper resistance range within the look-up table, and the slope and information and the constant information are obtained. The temperature is then mathematically calculated by utilizing the first order algebraic equation $T = MX + B$, where M is the slope information, X is the input digital signal related to the resistance of the thermistor, B is the constant information, and T is the calculated equivalent temperature. After the calculation, the computer 20 multiplexes signals representative of the calculated equivalent temperature to the display 32.

Figure 4:
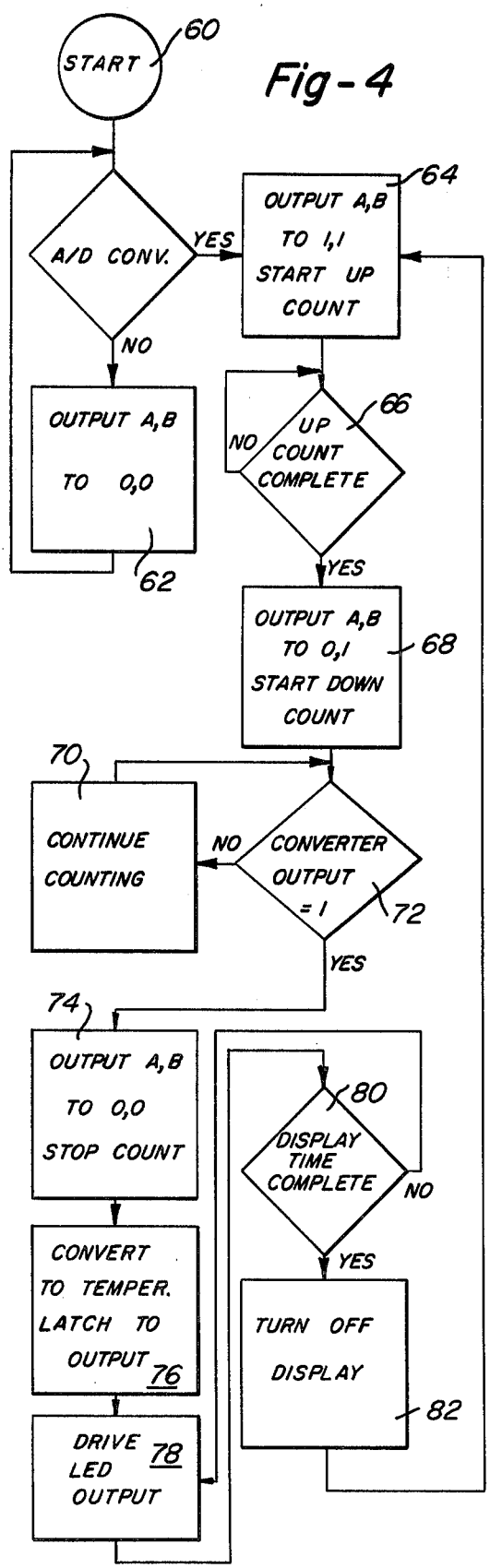
FIG. 4 is a flow diagram illustrating the operation of the linearized digital thermometer shown in FIG. 1.

Control over the apparatus 10 by the microprocessor based computer 22 is illustrated by the flow diagram of FIG. 4. When power is initially applied, the program counter of the microprocessor is reset to begin the program. The reset condition is represented at the start 60 in FIG. 4. If the converter 20 is not already operating, the signals "A" and "B" are set to logic 0 levels shown at 62, which defines the beginning of time period $T_O$. Whenever the null condition is obtained as shown at 64, the signals "A" and "B" are set to logic 1 levels which starts the positive integration (represented by graph portion 46) and the time period $T_1$. After a predetermined time determined by the computer shown at 66, the signals "A" and "B" are changed to logic levels 0 and 1 respectively shown at 68. The event signalled at 68 terminates the time period $T_1$ and begins time period $T_2$ during which negative integration (represented by graph portion 54) occurs. A count is accumulated at 70 during the time period $T_2$ until the digital output signal 56 from the converter is received as a logic level 1 at 72. At this point, the signals "A" and "B" are set to logic levels 0 at 74. The count represented at 70 represents the time period $T_2$ and the digital measurement signal and the resistance of the thermistor 12.

The digital measurement signal represented at 70 is converted to the temperature equivalent at 76 by the method previously described. The equivalent temperature calculated is then supplied to the display at 78 for a predetermined time determined at 80. After the display is complete, the display is turned off at 82. The program then returns to complete another calculation of the equivalent temperature of the thermistor in the manner previously described.

Figure 7:
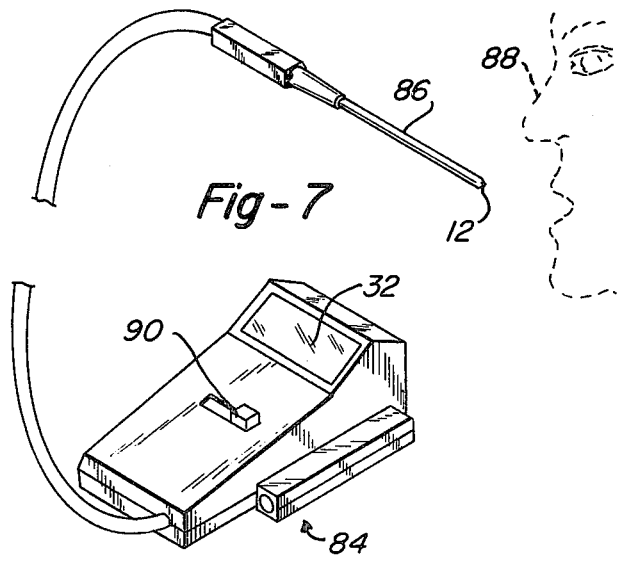
FIG. 7 is a perspective view of an exemplary clinical thermometer suitable for taking the temperature of a human individual, in which the present invention may be advantageously incorporated.

By use of an apparatus 10 it is possible to obtain highly accurate equivalent temperature measurements through the use of a relatively small number of very small digital electronic circuit elements. By use of the piece-wise linearization technique illustrated in FIG. 6, the amount of memory required within the computer to store information relating to the response characteristic of the thermistor is greatly minimized while still providing a high degree of accuracy in simulating the actual response characteristics of the thermistor to obtain accurate measurements. The apparatus 10 can be conveniently contained within a small thermometer 84 illustrated in FIG. 7. The thermometer 84 includes a probe 86 to which the thermistor 12 has been attached. The probe 86 is adopted for contact with a substrate whose temperature is to be measured such as by insertion into a body cavity, such as the mouth, of an individual 88 whose temperature is to be taken. A switch 90 controls operation of the apparatus 10, and the temperature is displayed for convenient reading at the display 32.

Figure 8:
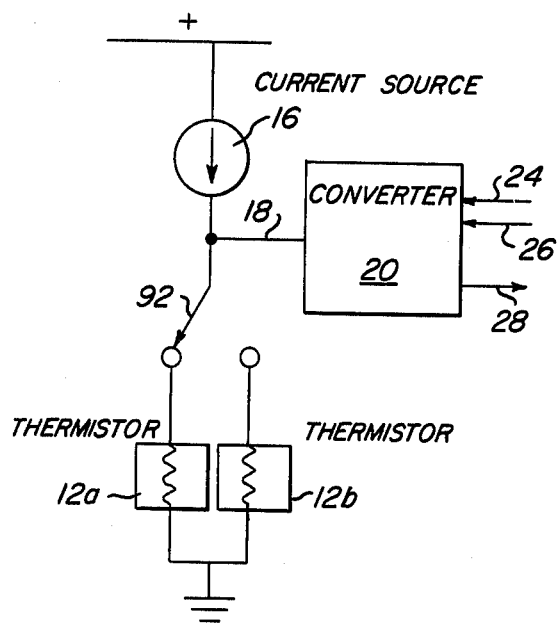
FIG. 8 is a schematic diagram of circuit elements which may be substituted for certain elements shown in FIG. 1, to allow use of the invention for measuring a plurality of different temperatures.

Means for selectively measuring one of a plurality of different temperatures is illustrated in FIG. 8. In substitution for the single thermistor 12 of the apparatus 10, there are provided a plurality of thermistors illustrated by thermistors 12a and 12b. A switch 92 is operatively connected to connect one of the plurality of the thermistors to the conductor 18 and to the current source 16, and thereby operatively connect that thermistor for supplying a temperature related voltage to the converter 20. Each of the thermistors is positioned to measure the temperature in a different environment, for example, the indoor temperature in a dwelling house and the outdoor temperature of the dwelling house. By positioning the switch 92 to connect the conductor 18 and current soucre 16 to one of the thermistors, the temperature of the environment with which the thermistor is in contact is calculated in the manner previously described.

Figure 9:
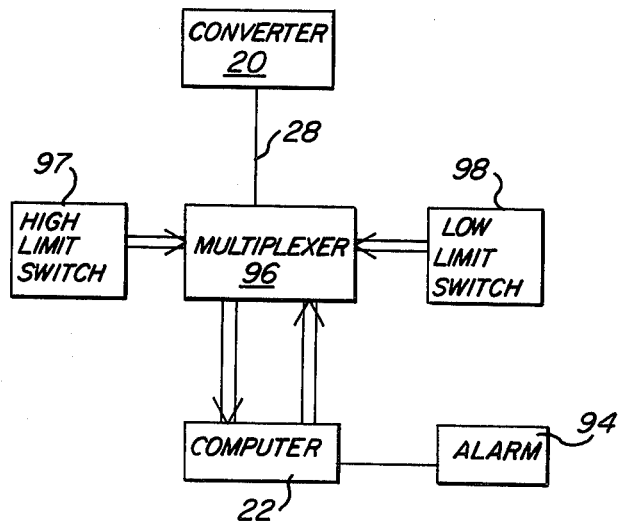
FIG. 9 is a block diagram of elements which may be used in addition to those shown in FIG. 1, to monitor temperature within a preselected range and to control other devices in accordance with the temperature within the limits of selected range.

Means for monitoring temperature within a predetermined range of temperature and for operatively controlling a device such as an alarm 94 if the temperature passes out of that range is illustrated in FIG. 9. In this arrangement, a multiplexer 96 is electrically connected between the converter 20 and the computer 22. The multiplexer 96 operates under the control of the computer 22 to conduct the digital signal 56 from the converter to the computer. A high limit switch 97 and a low limit switch 98 are electrically connected to the multiplexer 96 to set the high limit value within the range and set the low limit value within the range, respectively. The limit switches 97 and 98 are conventional thumb wheel switches providing an output digitally related to the numerical limits set in the switches. Under the control of the computer 22 and after each equivalent temperatutre measurement is calculated, the calculated equivalent temperature is compared to either the high limit or low limit set by the switches 97 and 98. With the next equivalent temperature calculation, the calculated temperature is compared to the other limit set by the switch not previously checked. In this manner, the comparison of each calculated equivalent temperature alternates back and forth in comparison between the high and low limits set by the switches 97 and 98. Should the calculated eqivalent temperature fall outside of the range limits set by the switches, the computer provides a signal to the controlled device or alarm 94. The alarm signal is provided by the computer 22 through the circuit element 65 shown in FIG. 3. The alarm 94 may take the form of a visual or audible signal, for example, or may be a control device used to achieve a particular function. One example of a desirable use for the circuit arrangement shown in FIG. 9 is in medical thermometers which alert medical personnel to the event of patient's temperature changing outside of predetermined limits.

The new and improved linearized digital thermometer has been described with a certain degree of particularity, but it should be understood that the present disclosure has been made by way of example and that changes in details of structure may be made without departing from the spirit of the invention.

I claim as my invention:
1. An electronic thermometer, comprising:
   a thermistor having a predetermined non-linear temperature and resistance relationship characteristic;
   a source operatively connected for directing a constant current through the thermistor to thereby create an analog voltage across said thermistor related to thermistor temperature by the predetermined temperature and resistance relationship;
   visual display means operatively connected in said electronic thermometer for visually displaying an indication of a calculated equivalent temperature as sensed by said thermistor;
   converter means operatively connected for receiving the analog voltage across said thermistor and for supplying a digital signal directly related to the analog voltage;
   computer means operatively connected for controlling said converter means to supply the digital signal, for calculating an equivalent temperature from the digital signal applied from said converter means, and for operatively controlling said display means to display a visual indication of the calculated equivalent temperature; said computer means including a solid state preprogrammed read only memory containing information in a lookup table defining a predetermined piecewise linearized approximation of the predetermined non-linear temperature and resistance characteristic of said thermistor, the information in said lookup table including slope and constant information for each segment of the piecewise linearized approximation; said computer means calculating the equivalent temperature for each individual digital signal supplied by said converter means by relating each digital signal from said converter means to the piecewise linearized approximation recorded in the lookup table, by obtaining slope and constant information for each digital output signal from said lookup table, and by digitally performing a first order algebraic calculation with each digital signal and with the slope and constant information obtained for that digital signal, the result of the calculation being the equivalent temperature; and said computer means conducting a signal representative of the equivalent temperature to said display means and controlling said display means to visually display an indication of the equivalent temperature.

2. Apparatus as recited in claim 1 wherein said thermometer is adapted for measuring the temperature of a human being and further comprises probe means adapted for insertion into a body cavity of the human being, said probe means thermally connecting with said thermistor.

3. Apparatus as recited in claim 2 further comprising:
means for monitoring equivalent temperature within a predetermined range of temperatures and for operatively controlling an alarm upon the temperature passing outside of the predetermined range, said monitoring and controlling means being operatively connected with said computer means.

4. A thermometer as recited in claim 1 further comprising means for selectively measuring one of a plurality of different temperatures, said selective measuring means being operatively connected with said thermistor and said converter means, and wherein said selective measuring means comprises:
a plurality of thermistors thermally positioned within environments whose temperatures are to be measured, each of the thermistors of said plurality possessing approximately the same predetermined non-linear temperature and resistance relationship characteristic, and
switch means for electrically connecting one of the thermistors at a time to said converter means.

5. Apparatus as recited in claim 4 further comprising:
means for monitoring temperature within a predetermined range of temperatures and for operatively controlling a control device upon the temperature passing outside of the predetermined range, said monitoring and controlling means being operatively connected with said computer means.

6. Apparatus as recited in claim 5 wherein said monitoring and controlling means comprises:
means for selectively setting the limits of the predetermined range, and
means for comparing each equivalent temperature signal to at least one of the limits of the predetermined range.

7. A method of electrically measuring human temperature, comprising the steps of:
providing a thermistor having a predetermined non-linear temperature and resistance relationship characteristic,
thermally contacting the thermistor with a portion of the body of the human individual,
directing a constant electrical current through the thermistor to thereby create an analog voltage across said thermistor related to thermistor temperature by the predetermined the temperature and resistance relationship,
converting the analog voltage across said thermistor into a digital signal directly related to the analog voltage,
storing a predetermined piecewise linearized approximation of the predetermined non-linear temperature and resistance characteristic of said thermistor in a lookup table of a solid state preprogrammed read only memory device, the information stored in said lookup table including slope and constant information for each segment of the piecewise linearized approximation,
calculating the equivalent temperature of said thermistor for each individual digital signal by relating each digital signal to the piecewise linearized approximation recorded in the lookup table, by obtaining slope and constant information for each digital signal from said lookup table, and by digitally performing a first order algebraic calculation with each digital signal and with the slope and constant information obtained for that digital signal, the result of the calculation being the equivalent temperature, and
visually displaying an indication of the equivalent temperature calculated.

8. A method as recited in claim 7 further comprising the steps of:
selecting a predetermined range of temperatures, and
monitoring the equivalent temperature calculated within the predetremined range.

9. A method as recited in claim 7 further comprising the steps of:
selecting a predetermined temperature, and
comparing the equivalent temperature calculated to the selected predetermined temperature.

10. A method as recited in claim 9 further comprising the step of:
signalling the event of the calculated equivalent temperature attaining the selected predetermined temperature.

* * * * *